(12) United States Patent
Denny et al.

(10) Patent No.: US 7,620,525 B2
(45) Date of Patent: Nov. 17, 2009

(54) METHOD OF GENERATING CAD FILES AND DELIVERING CAD FILES TO CUSTOMERS

(75) Inventors: John Denny, Indianapolis, IN (US);
Steve Hoffer, Indianapolis, IN (US);
Tony Hutchinson, Laguna Hills, CA (US)

(73) Assignee: SMC Corporation of America, Indianapolis, IN (US)

( * ) Notice: Subject to any disclaimer, the term of this patent is extended or adjusted under 35 U.S.C. 154(b) by 694 days.

(21) Appl. No.: 10/306,135

(22) Filed: Nov. 27, 2002

(65) Prior Publication Data
US 2003/0103083 A1     Jun. 5, 2003

Related U.S. Application Data

(60) Provisional application No. 60/334,525, filed on Nov. 30, 2001, provisional application No. 60/333,851, filed on Nov. 28, 2001.

(51) Int. Cl.
*G06F 17/50*     (2006.01)
*G06F 19/00*     (2006.01)

(52) U.S. Cl. .............. 703/1; 700/97; 700/182

(58) Field of Classification Search ............ 703/1; 700/97, 182, 95, 98
See application file for complete search history.

(56) References Cited

U.S. PATENT DOCUMENTS

| 5,610,833 | A | * | 3/1997 | Chang et al. | ............ 716/11 |
| 5,819,062 | A | * | 10/1998 | Srikantappa | ............ 716/11 |
| 5,923,573 | A | * | 7/1999 | Hatanaka | ............ 703/2 |
| 5,950,374 | A | * | 9/1999 | Gromat | ............ 52/93.2 |
| 6,037,945 | A | * | 3/2000 | Loveland | ............ 345/420 |
| 6,647,305 | B1 | * | 11/2003 | Bigelow | ............ 700/97 |
| 6,999,907 | B2 | * | 2/2006 | Smith | ............ 703/1 |
| 7,043,408 | B2 | * | 5/2006 | Camiener et al. | ............ 703/1 |
| 2002/0107673 | A1 | * | 8/2002 | Haller et al. | ............ 703/1 |

OTHER PUBLICATIONS

Maxey et al., New Riders' Reference Guide to AutoCAD Release 13, 1995.*
Advanced Excel 2000 User Manual, (Dec. 1999).*

* cited by examiner

*Primary Examiner*—Paul L Rodriguez
*Assistant Examiner*—Andre Pierre Louis
(74) *Attorney, Agent, or Firm*—Barnes & Thornburg LLP

(57) ABSTRACT

A method of generating a CAD model of a part in a series of parts uses an assembly design table modified to provide the necessary parameters for creation of the model from the value of the parameters of the part that distinguish the part from the other parts in the series of parts. A user may identify the part to be modeled through a user interface on a computer on a network that communicates with a database of part numbers on a computer on the network and a CAD model server on the network.

58 Claims, 18 Drawing Sheets

Fig. 3 sdb_pattern : Table

| pattern_code | pattern_name | pattern_desc |
|---|---|---|
| 2031 | Air Cylinder Series C(D)Q2 Double Acting Single Rod | |
| 2031X | | |
| 2031XX | | |
| 2032 | Air Cylinder Series CQ2 Single Acting Single Rod | |
| 2033 | Air Cylinder Series C(D)Q2 Double Acting Double Rod | |
| 2034 | Air Cylinder Series C(D)Q2K Double Acting Non-rotating Singl | |

| pattern_code | block_id | block_name | block_desc | block_index | block_isspec | value_index_default |
|---|---|---|---|---|---|---|
| 2031 | 5160 | C | | 0 | 0 | -1 |
| 2031 | 5168 | Magnet | | 1 | -1 | 0 |
| 2031 | 5167 | Q2 | | 2 | 0 | -1 |
| 2031 | 5163 | Mounting | | 3 | -1 | -1 |
| 2031 | 5164 | Bore Size | | 4 | -1 | -1 |
| 2031 | 5165 | Piping | | 5 | -1 | 0 |
| 2031 | 5170 | - | | 6 | 0 | -1 |
| 2031 | 5169 | Stroke | | 7 | -1 | -1 |
| 2031 | 5166 | Action | | 8 | 0 | -1 |
| 2031 | 5171 | Option | | 9 | -1 | -1 |
| 2031 | 5159 | - | | 10 | 0 | 1 |
| 2031 | 5162 | Auto Switch | | 11 | -1 | 0 |
| 2031 | 5161 | Number | | 12 | -1 | 2 |

Fig. 4

Fig. 5 sdb_pattern_rule: Table

| pattern_code | rule_id |
|---|---|
| 2031 | 4338 |
| 2031 | 4339 |
| 2031 | 4340 |
| 2031 | 4341 |
| 2031 | 4342 |
| 2031 | 4343 |
| 2031 | 4344 |
| 2031 | 4345 |
| 2031 | 4346 |

Record: 4270 of 14373 sdb_rule_value: Table — 502

| rule_id | block_id | value_code | value_type |
|---|---|---|---|
| 4338 | 5162 | F9BW | VALUE |
| 4339 | 5164 | 20 | VALUE |
| 4339 | 5162 | F9NWZ | VALUE |
| 4340 | 5164 | 20 | VALUE |
| 4340 | 5162 | F9NWVZ | VALUE |
| 4341 | 5164 | 20 | VALUE |
| 4341 | 5162 | F9NWVL | VALUE |
| 4342 | 5164 | 20 | VALUE |
| 4342 | 5162 | F9NWV | VALUE |

Fig. 6

| T_ProhibitedBlock: Table | | | | | | | | | | | | |
|---|---|---|---|---|---|---|---|---|---|---|---|---|
| PageNo | StdNo | RecordNo | StartPosition | Data1 | Data2 | Data3 | Data4 | Data5 | Data6 | Data7 | Data8 | Data9 | Data10 |
| 2031 | 0 | 2 | 4 | | | D | | | | | | | F |
| 2031 | 0 | 3 | 4 | | | D | | | | | | | FC |
| 2031 | 0 | 4 | 4 | | | D | | | | | | | FCM |
| 2031 | 0 | 5 | 4 | | | D | | | | | | | FM |
| 2031 | 0 | 6 | 4 | | | F | | | | | | | F |
| 2031 | 0 | 7 | 4 | | | F | | | | | | | FC |
| 2031 | 0 | 8 | 4 | | | F | | | | | | | FCM |
| 2031 | 0 | 9 | 4 | | | F | | | | | | | FM |
| 2031 | 0 | 10 | 4 | | | G | | | | | | | F |
| 2031 | 0 | 11 | 4 | | | G | | | | | | | FC |
| 2031 | 0 | 12 | 4 | | | G | | | | | | | FCM |
| 2031 | 0 | 13 | 4 | | | G | | | | | | | FM |
| 2031 | 0 | 14 | 4 | | | L | | | | | | | F |
| 2031 | 0 | 15 | 4 | | | L | | | | | | | FC |
| 2031 | 0 | 16 | 4 | | | L | | | | | | | FCM |
| 2031 | 0 | 17 | 4 | | | L | | | | | | | FM |

Fig. 7

| sdb_block_value: Table | | | | |
|---|---|---|---|---|
| block_id | value_index | value_code | value_name | value_desc |
| 5163 | 4 | G | | Rear Flange |
| 5163 | 3 | F | | Front Flange |
| 5163 | 2 | D | | Double Clevis |
| 5163 | 1 | B | | Through Hole(Standard) |
| 5163 | 0 | A | | Both Ends Tapped |
| 5163 | 5 | L | | Foot |
| 5164 | 8 | 80 | | ø80 |
| 5164 | 3 | 25 | | ø25 |
| 5164 | 9 | 100 | | ø100 |
| 5164 | 7 | 63 | | ø63 |
| 5164 | 6 | 50 | | ø50 |
| 5164 | 4 | 32 | | ø32 |
| 5164 | 2 | 20 | | ø20 |
| 5164 | 1 | 16 | | ø16 |
| 5164 | 0 | 12 | | ø12 |
| 5164 | 5 | 40 | | ø40 |
| 5165 | 0 | | | Screw-in |
| 5165 | 1 | F | | One-touch Fitting |
| 5466 | 0 | D | | Double Acting |
| 5167 | 0 | Q2 | | Q2 |

Fig. 8

|   | A | B | C | D | E | F | G | H | I |
|---|---|---|---|---|---|---|---|---|---|
| | Worksheet in Cylinder Body.SLDPRT | | | | | | | | |
| 1 | Design Table for: Cylinder Body | | | | | | | | |
| 2 | | $STATE@Base-Extrude | D1@Sketch1 | D2@Sketch1 | D3@Base-Extrude | $STATE@Cut-Extrude1 | D4@Sketch2 | D5@Cut-Extrude1 | |
| 3 | 25mmBoreTube | U | 40 | 35 | 85 | U | 25 | 80 | |
| 4 | 32mmBoreTube | U | 50 | 42 | 95 | U | 32 | 85 | |
| 5 | 40mmBoreTube | U | 60 | 48 | 105 | U | 40 | 90 | |
| 6 | | | | | | | | | |

Columns 1410, 1412, 1414 point to columns F, G, H.

| | A | B | C | D | E |
|---|---|---|---|---|---|
| 1 | Design Table for: Simple Piston Assy | | | | |
| 2 | | $STATE@Cylinder Body<1> | $CONFIGURATION@Cylinder Body<1> | $STATE@PistonRod<1> | $CONFIGURATION@PistonRod<1> |
| 3 | | R | 25mmBoreTube | R | 25BoreFemale |
| 4 | | R | 25mmBoreTube | R | 25BoreMale |
| 5 | | R | 32mmBoreTube | R | 32BoreFemale |
| 6 | | R | 32mmBoreTube | R | 32BoreMale |
| 7 | | R | 40mmBoreTube | R | 40BoreFemale |
| 8 | | R | 40mmBoreTube | R | 40BoreMale |

Fig. 20

| | A | B | C | D | E | F | G | H |
|---|---|---|---|---|---|---|---|---|
| 1 | Design Table for: Simple Piston Assy | $PRP@Bore Size | $PRP@Body Option | $STATE@Cylinder Body<1> | $CONFIGURATION@Cylinder Body<1> | $STATE@PistonRod<1> | $CONFIGURATION@PistonRod<1> | |
| 2 | | 25 | M | R | 25mmBoreTube | R | 25BoreMale | |
| 3 | 25BoreMale | | | | | | | |
| 4 | | | | | | | | |

METHOD OF GENERATING CAD FILES AND DELIVERING CAD FILES TO CUSTOMERS

RELATED APPLICATION

The present application claims the benefit of U.S. Provisional Patent Application Ser. No. 60/333,851, filed Nov. 28, 2001, and U.S. Provisional Patent Application Ser. No. 60/334,525, filed Nov. 30, 2001, the complete disclosures of which are hereby expressly incorporated by reference.

BACKGROUND AND SUMMARY

This invention relates generally to the generation of CAD files for customer use of products available from a supplier's inventory and more particularly to the generation of CAD files on the fly in response to a customer request for a CAD file of a desired product.

Engineers and product designers have become more dependent on the use of CAD files in developing new products. Often new products incorporate parts made by outside suppliers or vendors. Such parts are selected from an inventory of available products. The development time for new products can be greatly reduced by viewing CAD files of parts available from outside suppliers or vendors. Also, it is often desirable to incorporate CAD files of parts from vendors or suppliers into CAD models of the product under development. Preferably, the CAD files of the parts to be analyzed or incorporated into CAD models can be received from the outside supplier or vendor to avoid having to generate the CAD files of the parts from scratch. Many suppliers and vendors provide their customers and potential customers with CAD files of parts from their inventory. Additionally, even when all of the parts used in a product are made in-house, CAD models of the various parts are often developed by different programmers, engineers and designers within the company.

Often parts are very similar, varying only in size, capacity or the availability of various component add-ons. Typically parts are comprised of components which are combined into a final assembly. Companies that supply CAD files of certain parts to customers and to in-house engineers and designers typically generate assembly models of all of the variations of similar parts available in their inventory. Additionally, such companies generate component design tables for each of the components which are used in any of the variations of the part. It can be very time consuming to generate assembly models of each variation of a part using standard CAD modeling techniques. Also, each CAD model of a variation of a part needs to be stored.

The disclosed method of generating CAD files reduces the storage space required for all of the variations of models and reduces development time of alternative models. The disclosed method of generating CAD models permits a base assembly model of a part to be developed and models of variants of the part to be generated from the base assembly model. The sizes of various components of, as well as the availability of various component add-ons to, a part is often dictated by the selection of a very few controlling parameters. By identifying the controlling parameters, the information required to generate a CAD file can be substantially reduced. Various formulas can be established to generate the remaining parameters or data required for the generation of a CAD file based upon the controlling or driving data. A CAD file generating program is supplied the base model for a part including the driving parameters necessary to generate the driving data and the formulas necessary to generate the driven data from the driving parameter. The CAD file generating program is supplied the driving parameters for different part and impliments the rebuild function to generate a CAD model for the different part. The CAD generating program may be resident on a CAD server connected to a network.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying drawings in which:

FIG. 3 depicts a table of the sdb_pattern data of FIG. 2;

FIG. 4 depicts a table of sdb_pattern_block data of FIG. 2;

FIG. 5 depicts a table of sdb_pattern_rule data of FIG. 2;

FIG. 6 depicts a table of sdb_rule_value data of FIG. 2;

FIG. 7 depicts a ProhibitedBlock data;

FIG. 8 depicts sdb_block_value data of FIG. 2;

FIG. 16 is an expanded component design table including data required to generate a CAD model of three instances of a cylinder component;

FIG. 20 depicts a traditional assembly design table showing all of the data used to combine the three instances of cylinder components of FIG. 17 with the male and female versions of the three instances of rods of FIG. 18 to form valid part numbers;

FIG. 21 depicts a modified assembly design table showing all of the data used to combine the three instances of cylinder components of FIG. 17 with the male and female versions of the three instances of rods of FIG. 18 to form valid part numbers wherein two parameters are used to generate all of the additional parameters required for generation of the CAD model.

DETAILED DESCRIPTION OF THE DRAWINGS

The present invention is best understood by referring to one or more illustrative embodiments of the invention, and of the environments in which the invention may be used. These illustrative embodiments are provided to aid in the understanding of the invention, and are not intended to limit the invention in any way.

One illustrative environment in which an illustrative embodiment of the invention may be used is in the ordering of parts or assemblies, or the downloading of models of parts or assemblies via the worldwide web. This embodiment may be better understood by first briefly explaining how parts are ordered generally.

When customers order parts from suppliers, generally a part number identifies the desired part. Part numbers associate a given product with a given number which may or may not be serialized. Part numbers may impart meaning, or can be assigned arbitrarily. A part number having a meaning is referred to herein as a "smart" or "meaningful" part number. A part number that is arbitrarily assigned is typically referred to as a "stock keeping unit", or an "SKU". The present invention is best suited for use with part numbers where individual portions of a part number have meaning, although it is believed to be useful with arbitrarily assigned part numbers as well.

An example of a part numbering system utilizing meaningful part numbers is shown below in FIG. 1. This example shows the parameters of a part number 101. In this illustrative example, part number 101 represents a particular pneumatic cylinder for use in the automated assembly operations. Process engineers for manufacturing concerns design automated assembly lines, which utilize a plethora of these types of cylinders. These engineers choose each cylinder they will use based on what they know of the function it will perform.

For example, if a cylinder will be used to lift a platform supporting a an article, the engineer will choose a cylinder based on the force it can exert and the distance over which it can exert that force. The engineer's selection of the appropriate cylinder may also be based upon size, mounting methods, and other considerations regarding how the cylinder will interact with adjoining components of the assembly line.

Figure 1:
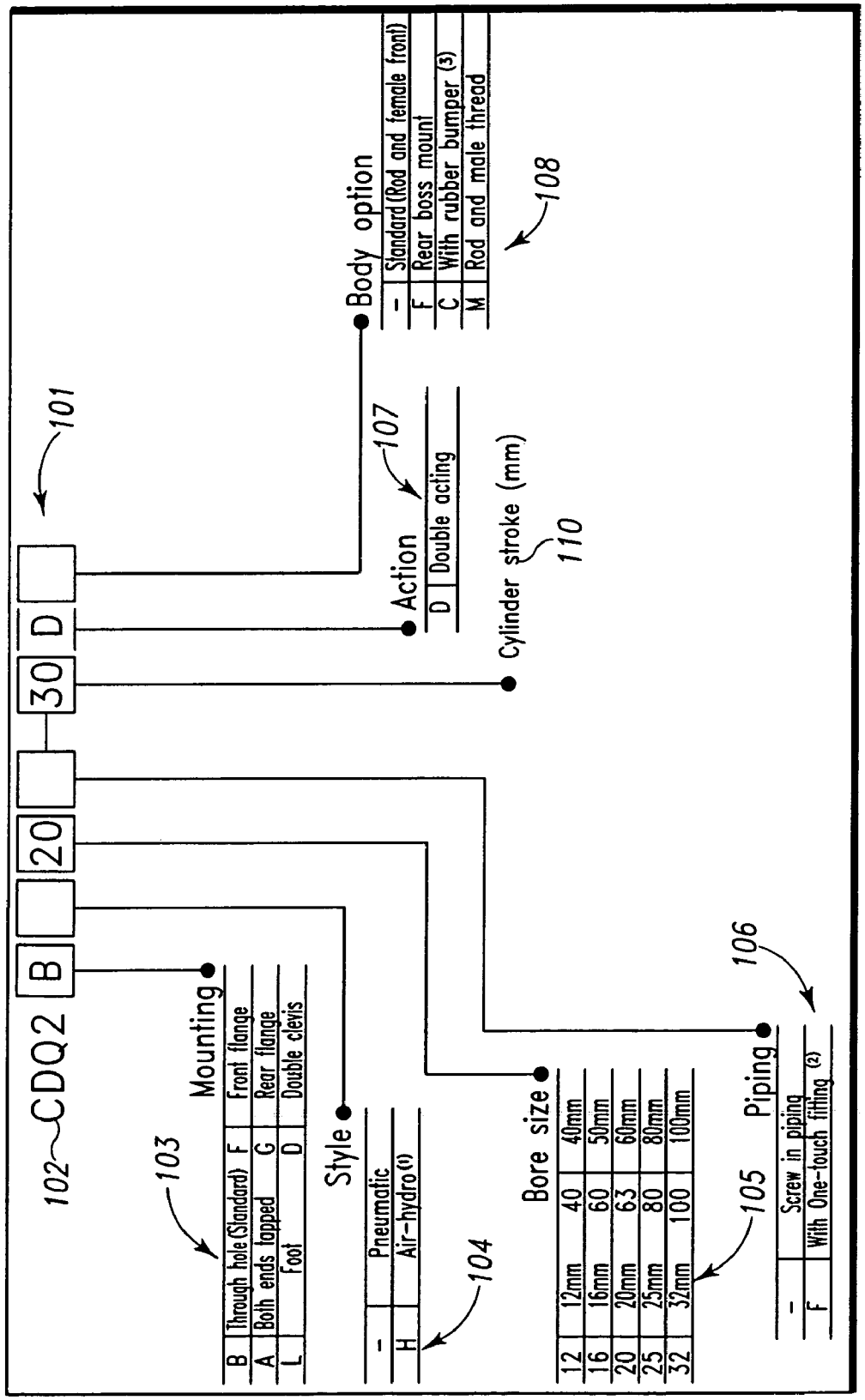
FIG. 1 depicts a part numbering system wherein various elements of the part number identify particular parameters of the part being identified.

Referring to the illustrative part numbering system of FIG. 1, the ordering options for a family of related cylinders known as the CQ2 series of cylinders is described. Note that the order of the options within the part number is also specified. By arranging the desired parameters in the proper order, an engineer can create the part number for the specific cylinder he wishes to order. Traditionally, engineers referred to product catalogs to find such ordering information, where a picture and/or description of a device would be shown next to an ordering chart.

Considering the specifics of FIG. 1, the root series 102 in this example is either CQ2 or CDQ2. The first parameter, mounting option parameter 103, indicates the mounting option. The illustrated possible values for mounting option parameter 103 are B, A, L, F, G, or D. These values indicate mounting using a through-hole, tapped threads, a foot bracket, a flange mounted to the front of the cylinder, a flange mounted to the rear of the cylinder, or a double-clevis assembly mounted to the rear of the cylinder respectively.

Style option parameter 104, bore size option parameter 105, piping option parameter 106, action option parameter 107, and body option parameter 108 are selected in a similar manner to mounting option parameter 103. Cylinder stroke option parameter 110 is selected as a numerical value representing the desired cylinder stroke in millimeters. Selecting part numbers for ordering parts from catalogs is well known in the art.

Methods of ordering parts using computer systems are also common. This is accomplished by using a relational database, such as that shown schematically in FIG. 2 as database 200, to define the relationships between part numbers. Database 200 includes substantially the same key elements of the part numbers as described in the example shown in FIG. 1 above. However, database 200 also allows for the presenting of the parameters to a user (customer) in a dynamic fashion.

Database 200 is contained on a server computer. Database 200 is not directly accessed by the customer. Rather, the customer will access the data in database 200 by the use of client software running on a computer to which the customer (the user) has access. The server software receives information from database 200 and formats it for use by the client software, which is usually a graphical user interface, such as a web browser. In this manner the user may indirectly access database 200 through the client and server computers. One preferred embodiment for the format of database 200 is an SQL Server database. However, any relational or non-relational database may be used. The use of client/server architecture for the ordering of parts is well known in the art.

Figure 2:
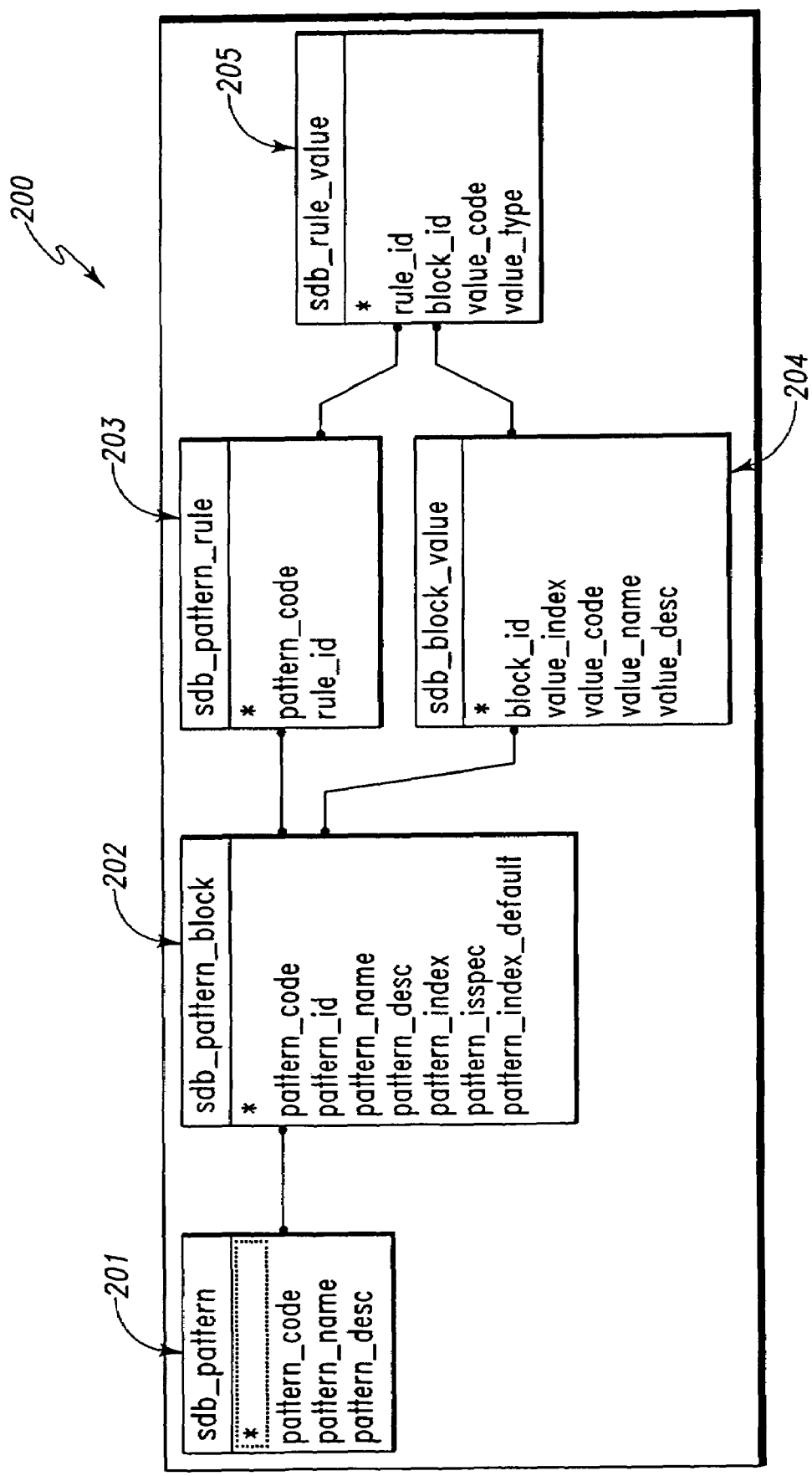
FIG. 2 is a relationship schematic of a database for the part numbering system of FIG. 1 showing the relationships between various types of data including sdb_pattern data, sdb_pattern_block data, sdb_pattern_rule data, sdb_block_value data, sdb_rule_value data.

Turning to FIG. 2, a relationship schematic for an illustrative part number database 200 is shown. The diagram of FIG. 2 shows the relationships of various types of data. It is helpful to reference this diagram when reviewing diagrams that follow. The relationships are sbd_pattern 201, sbd_pattern_block 202, sbd_pattern_rule 203, sbd_block_value 204 and sbd_rule_value 205. Each of these relationships is described with an illustrative table, below.

Turning to FIG. 3, illustrative sbd_pattern table 301 is shown. Described in sbd_pattern table 301 are the relationship between pattern code 302, pattern name 303, and pattern description 304. Pattern code 302 (essentially an arbitrary number) links pattern name 303 to pattern description 304 for the CQ2 series. The pattern code for the CDQ2 double acting single rod cylinder series is 2031.

Turning to FIG. 4, illustrative sbd_pattern_block table 401 is shown. Described in sbd_pattern_block table 401 are the relationships between pattern code 302 and data elements 402-407. Pattern code 302, which identifies CDQ2 double acting single rod cylinders, is associated with a number of blocks 410 in block_id column 402 and a number of data descriptions 412 in block_name column 403. In particular, descriptions 412 are identified by using block_id 402, which references pattern_code 302 as a key. Descriptions 412 are ordered and grouped using block_index 405. Descriptions 412 are identified regarding the type of information contained (whether the information is a specified value) by block_isspec 406. For example, the letters "Q2", which are not specified by the user, are indicated in this manner.

Finally, descriptions 412 are set to a default value for display, using value_index_default 407. Value_index_default 407 is capable of representing one of a plurality of states to control, for example, whether a dash at the end of the part number 101 would be shown.

One function of database 200 is storing rules defining valid combinations of parameters 103-108 that constitute a part number 101 for series 102, and/or invalid combinations of parameters 103-108 that do not constitute a part number 101 for series 102. These rules are stored in two separate tables in database 200, and pattern code 302 is a key into the tables, as is described below.

Turning to FIG. 5, an illustrative sbd_pattern_rule table 501 is shown. Each rule_id 502 identifies the rules associated with one pattern code 302. Illustrative examples of rule associations are shown in sdb_pattern_rule table 501 in FIG. 5, and in sdb_rule_value table 601 in FIG. 6.

Referring again to FIG. 2, it is shown that the pattern_code 302 is the key into sdb_pattern table 301, sdb_pattern_block table 401, and sdb_pattern_rule table 501. Rule_id 502 is the key into sdb_rule_value table 601. So, given a particular pattern_code 302, it is possible to find all rules associated therewith.

Turning to FIG. 7, an illustrative ProhibitedBlock table 701 is shown. ProhibitedBlock table 701 relates the data in one field with data in another field. Line 703 of table 701 is interpreted as follows: "any part number 101 having first field 702 equal to 2031 (pattern code 302), having fourth field 704 equal to "D" (mounting option parameter 103) and having tenth field 705 equal to "F" (body option parameter 108) is invalid." Note that this prevents specifying a cylinder having a rear clevis and rear-mounting boss, two options that would physically interfere with each other. In like manner, other part number 101 combinations that are not available for purchase, for whatever reason, are similarly disallowed.

Turning to FIG. 8, an illustrative sdb_block_value table 801 is shown. Block_id field 802 cross-references value_code 803 to value_name 804 and value_description 805. Thus, the interrelationships of all data described in the relationship schematic shown in FIG. 2 have now been described. However, it would not be practical for a user to access this database to discern these relationships directly. Therefore, a suitable user interface is required.

One illustrative user interface is a graphical user interface, such as that provided by a web browser. Such an illustrative web browser interface will now be described. Those skilled in the art will recognize that any interface, graphical, voice, text, touch-tone telephone (DTMF), or the like, could be used to provide a suitable user interface.

Figure 9:
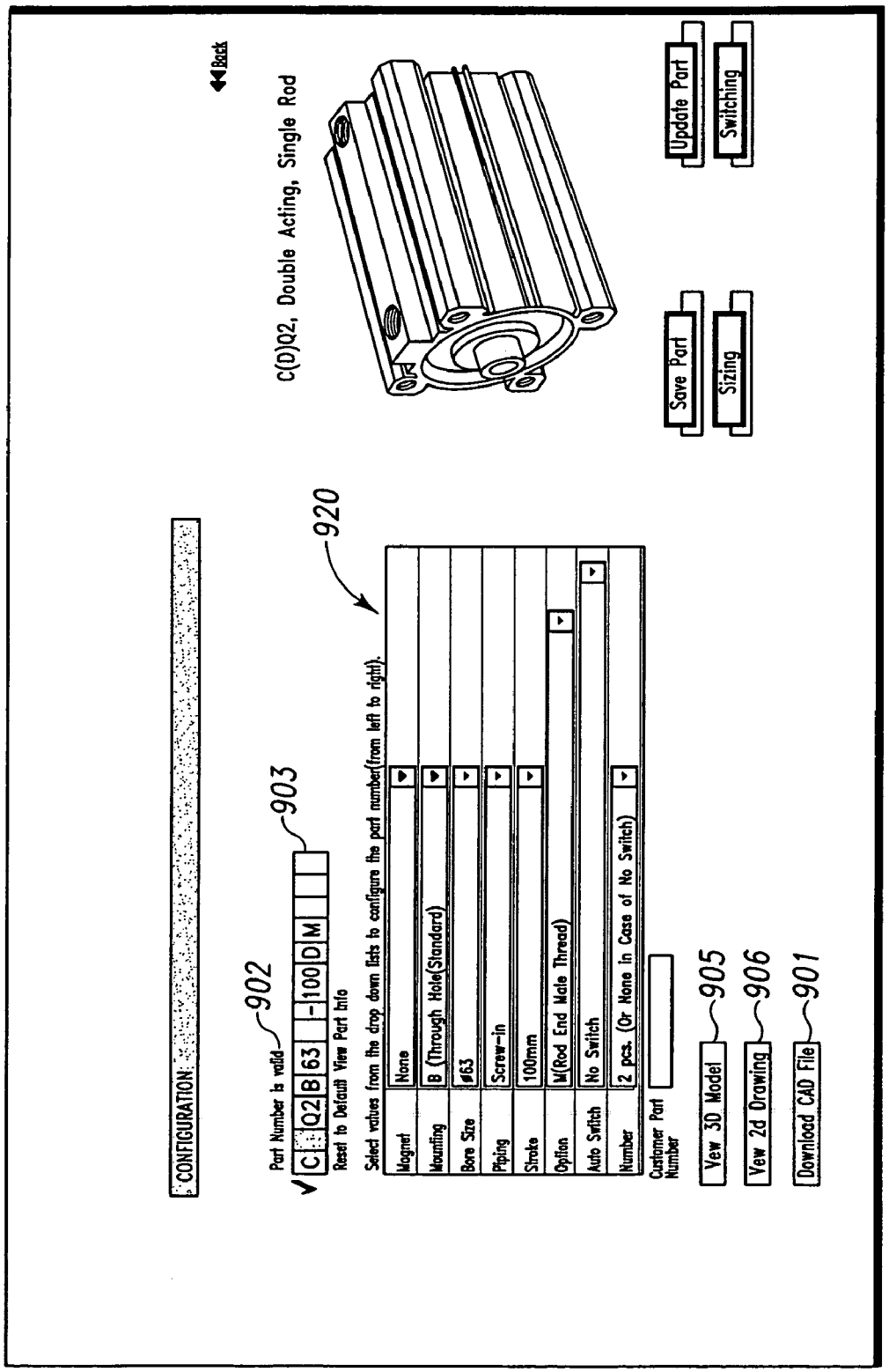
FIG. 9 depicts a web browser interface presenting data contained in the database of FIG. 2 to a user via a series of drop-down boxes.

Turning to FIG. 9, a portion of an illustrative web browser interface is shown. The data contained in the database is presented to the user via a series of drop-down selection widgets 920. The data displayed in FIG. 9 is that of the CQ2 cylinder series shown in FIG. 2. The user interacts with the drop-down selection widgets 920 to "build" part number 101, which is displayed in display widget 903. As the user builds part number 101, the rules defined within the database schema will continually update (in real time) validity indicator 902. Validity indicator 902 indicates whether part number 101 is a "partial" part number, an "invalid" part number, or a "valid part" number.

If certain of drop-down selection widgets 920 have not been activated, and remain in an undetermined state (i.e., the user has not selected a stroke), then validity indicator 902 indicates "Part Number partial". Additionally, a yellow "tilde" (not shown) is displayed immediately to the left of display widget 903.

If certain of drop-down selection widgets 920 have been activated in a manner that violate the rules contained in database 200 (i.e., specifying a cylinder having a rear clevis and rear mounting boss) then validity indicator 902 indicates "Part Number invalid". Additionally, drop-down selection widgets 920 containing the conflicting values are displayed in red, and a red exclamation point (not shown) is displayed to the left of the display widget 903, and a red triangle (not shown) is displayed to the left of each of the selection widgets 920 containing the conflicting values. The user has the option of correcting the conflict by selecting a different value from any of the drop-down selection widgets 920 containing the conflicting values. After a user has selected a valid part number 101, the selected part number may be viewed on-line, or downloaded to the user's computer for implementation in a design, viewing, or any other use.

Shown in FIG. 9 are three button widgets, view 3D model button widget 905, view 2D drawing button widget 906, and download CAD file button widget 907. If the user selects view 3D model button widget 905, an ActiveX control is activated allowing the user to view and manipulate a 3D model of the part represented by part number 101. If the user selects view 2D model button widget 906, a different ActiveX control is activated allowing the user to view and manipulate a 2D model of the part represented by part number 101. If the user selects download CAD file button widget 907, the user may download a CAD model of the part represented by part number 101 in either a 2D drawing format, or a 3D model format. Those skilled in the art will understand that ActiveX is not the only means by which the display of such models may be accomplished, and will appreciate that the use of other means may be employed without departing from the scope of the present invention.

For any of the three requests described in the preceding paragraph, the process utilized in fulfilling the request can be similar. A formatted request is sent in Extensible Markup language (XML) format from the web server to a server specializing in providing CAD models in a networked environment. Those skilled in the art will recognize that formatted requests from the web server to a server specializing in providing CAD models in a networked environment can alternatively be sent by EDI or other means within the scope of the disclosure. One such illustrative server is the 3D PartStream server operated by SolidWorks Corporation.

Requests to the 3D PartStream are in a standardized format, and include such information as model name, parameter names, and parameter values. Model name includes the pattern code described above, and the series. Parameter names include the block names previously described, and formatting characters. Parameter values include the block values previously described. Various other pieces of data are also included, such as the format for the request. XML is extensible, platform-independent, and it supports internationalization and localization. The use of the XML protocol for designing text formats to structure data is well understood by those skilled in the art.

Data relating to the CAD models is communicated from the web server to the 3D PartStream server. A process is utilized that allows for a CAD model to be uniquely identified by only the series name for the model, the parameter names associated with that series, and the corresponding parameter values. This process allows the 3D PartStream sever to re-configure the CAD model in a flexible manner. Of course, this same method could be used to dynamically configure models that were located on any computer, not only a 3D PartStream server, and such a computer could be accessed by any means, not only XML formatted network requests.

The details of the process for identifying a CAD model using only series name for the model, the parameter names associated with that series, and the corresponding parameter values will now be described in detail. First, it is helpful to explain how CAD models are normally identified. A variety of CAD/CAM software packages are available, and they will be well known to those skilled in the art. For purposes of illustration, the descriptions contained herein will be limited to the SolidWorks CAD package. However, this choice is illustrative, and is not intended to limit the present invention in any way.

Figure 10:
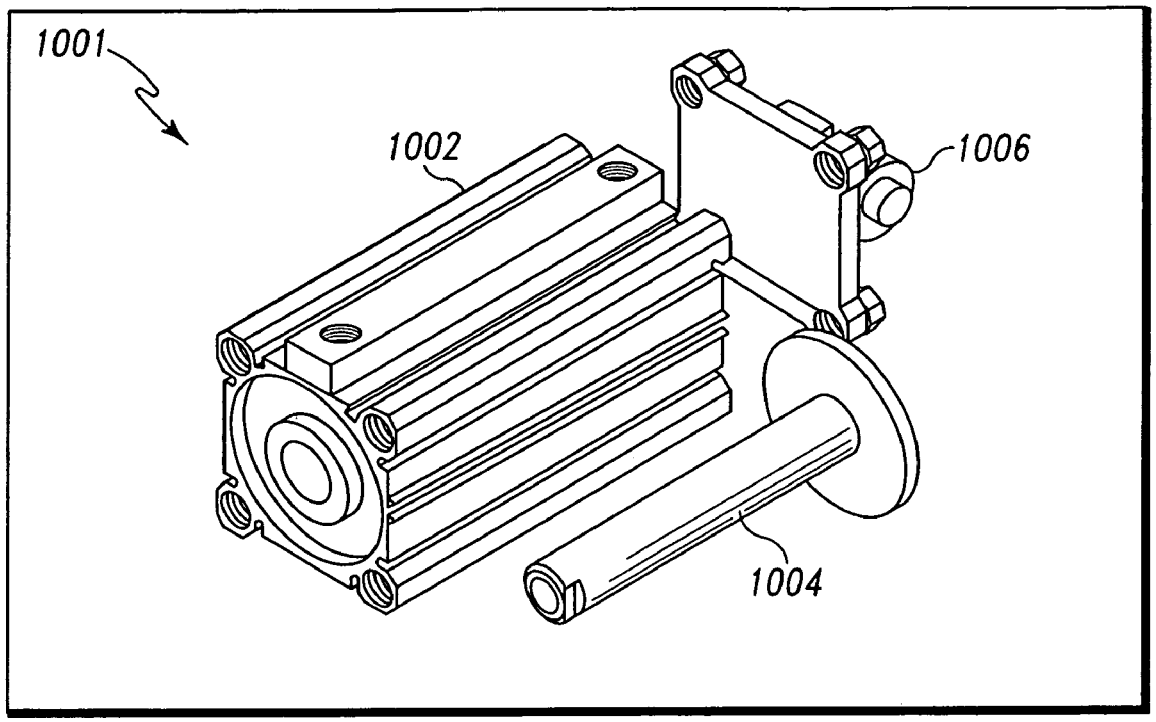
FIG. 10 is a perspective view of a CAD model of a part represented by the part number of FIG. 1 showing a cylinder, a rod and a mount that are components of the part.

Turning to FIG. 10, a CAD model 1001 of the part represented by a part number 101 equal to CQ2D63-100D is shown. Models consist of parts arranged into an assembly. Illustrative CAD model 1001 comprises the following parts: cylinder tube 1002, piston rod 1004, and rear clevis 1006.

In SolidWorks terminology, a part is made up of features. Each feature is composed of a sketch, which is created on a 2D plane transformed into a 3D entity via an operation, such as extruding, revolving, a revolved cut, or an extruded cut. The sketch is assigned specific dimensions between various sketch elements. The sketch elements may also be assigned specific constraints, such as symmetry about a centerline. These constraints allow the sketch to update in a predictable manner when dimensional values are changed. One skilled in the art will be familiar with how these types of assemblies are typically created.

Once a first instance of a part is created, it can also be made to have additional sizes or configurations. SolidWorks uses a Design Table, which is a linked Excel Spreadsheet, to convey the data for each of the different variations or configurations. Each configuration consists of a row in the design table that specifies the dimensional values for that particular configuration, and also specifies the state of various features, including whether that feature is "on" (unsuppressed) or "off" (suppressed).

Figure 11:
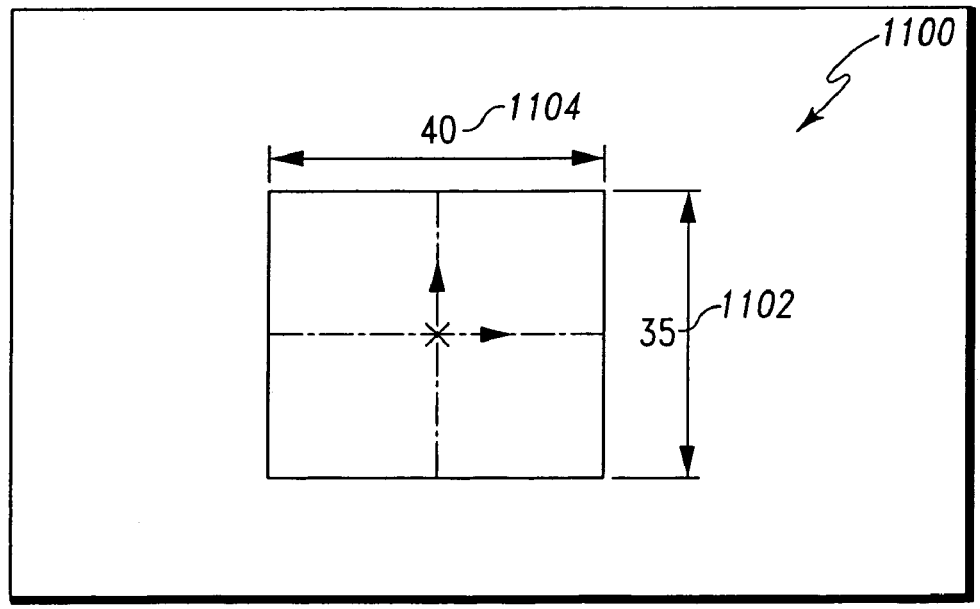
FIG. 11 depicts a 2D sketch used by a CAD file creator to begin to create the cylinder component of a CAD model of the part of FIG. 10.
Figure 12:
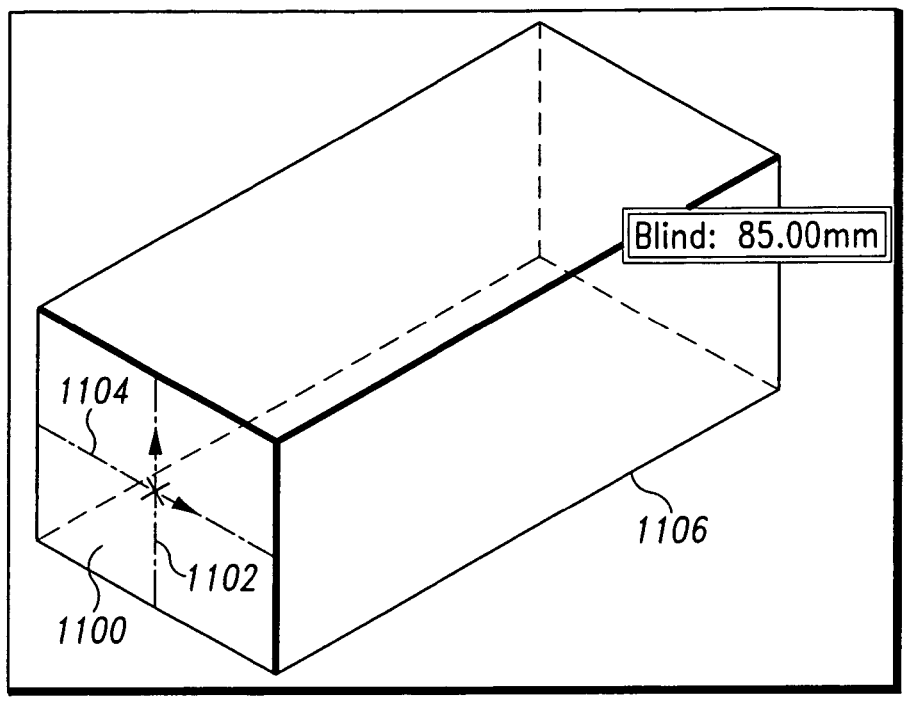
FIG. 12 depicts an extrusion of the 2D sketch of FIG. 11 defining the length of the cylinder component of the CAD model being created.
Figure 13:
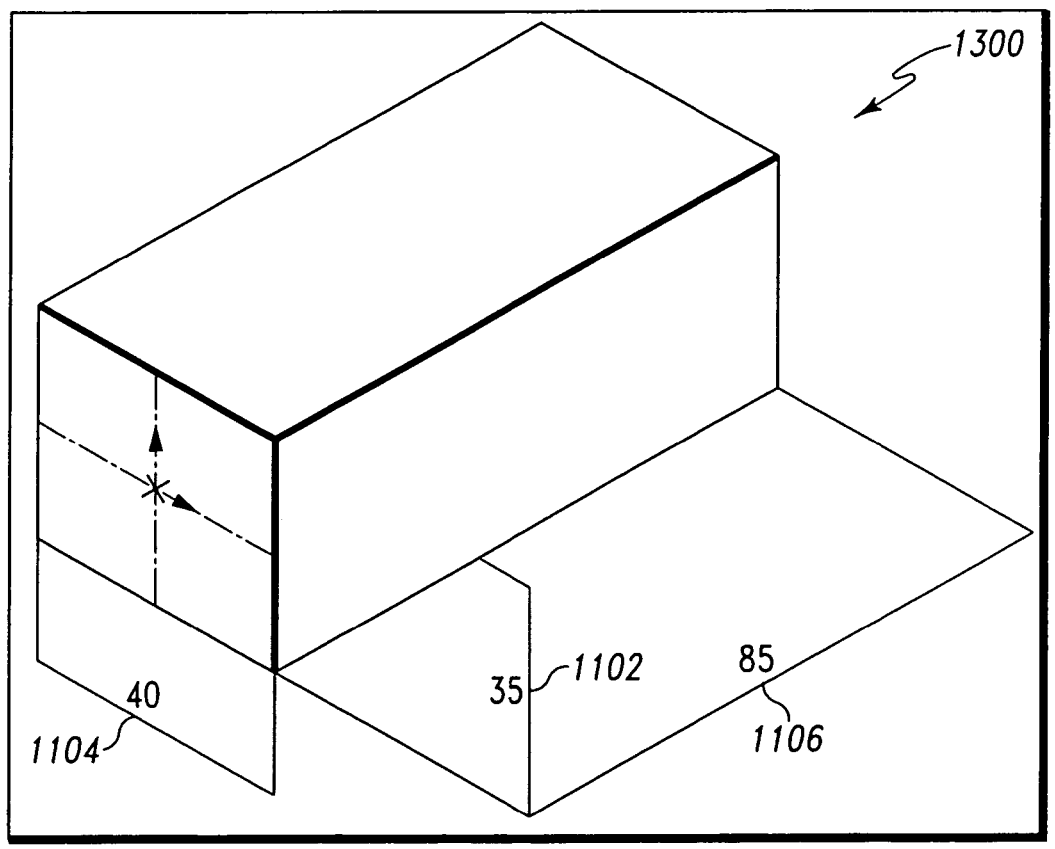
FIG. 13 depicts an intermediate step in developing the CAD model of the cylinder component of the part.

For example, consider the creation of a simple feature, a cylinder having rectilinear form. The rectangular shape can be defined in terms of length, width, and height. First, the user creates a sketch 1100, as shown in FIG. 11. Next, the user defines the height 1102 and width 1104 of the part. Finally, the user extrudes the 2D sketch to a specific length 1106, as shown in FIG. 12. These three dimensions define the basic feature 1300 for the cylinder, which is shown in FIG. 13.

Figure 14:
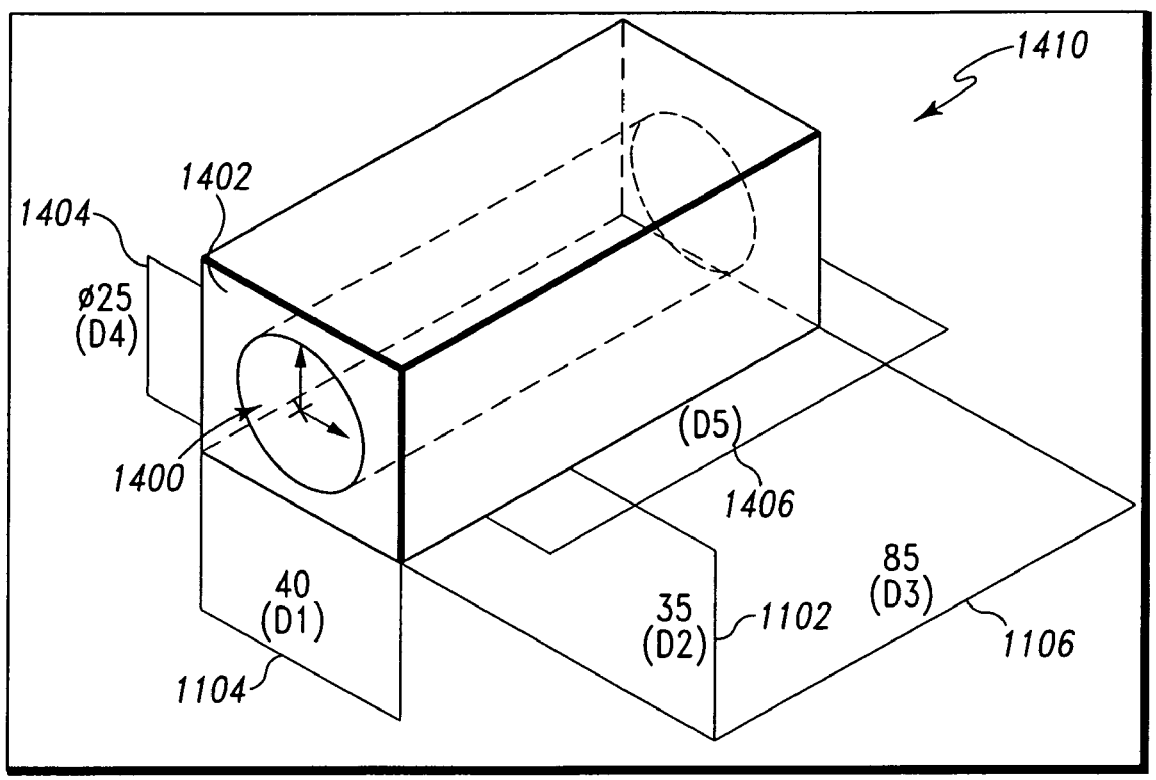
FIG. 14 depicts the completed model of the cylinder component of the part.

This feature can be modified by adding another feature, such as a cylindrical cut 1400. This feature can be defined using two conditions, and two dimensions. The first condition is that we want the cylindrical cut 1400 to start on the face 1402 of the cylinder. The second condition is that we want the circle to be centered on the face 1402 of the cylinder. The two dimensions needed are the diameter of the circle 1404, and the length 1406 of the cut. Shown in FIG. 14 is the completed model 1410 of one instance of a cylinder block, which comprises five dimensions and two features.

Figure 15:
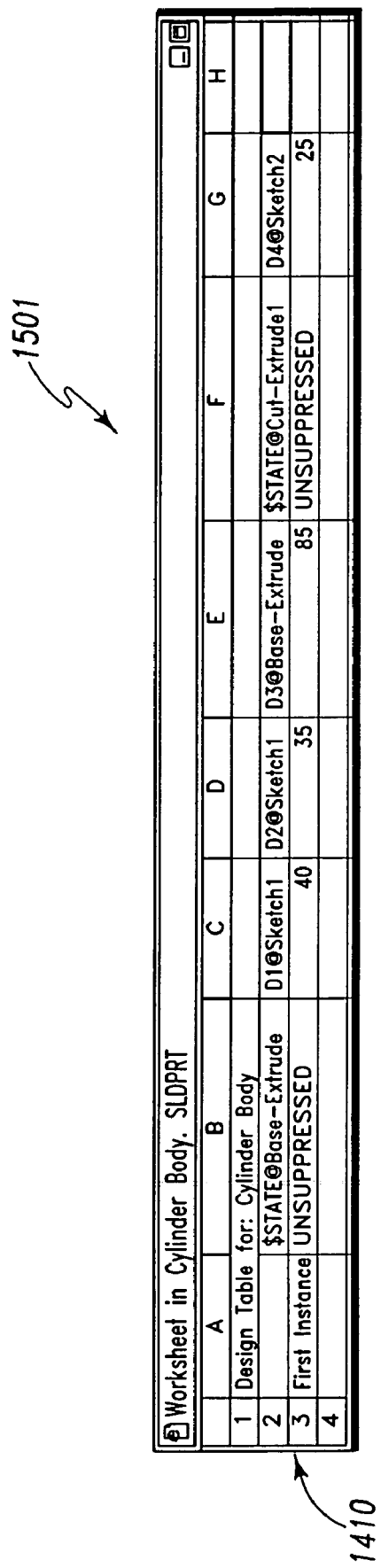
FIG. 15 is component design table of the data required to generate a CAD model of the cylinder component of FIG. 14.

The next step is to create multiple sizes of the cylinder body. For illustrative purposes, three sizes will be disclosed herein. However, any number of sizes may be created. First, design table 1501, shown in FIG. 15, is inserted into the model. Cell C3 of design table 1501 represents dimension one (D1), illustratively width 1104 of cylinder block, of the first instance 1410 of cylinder block, which has a value of 40. Referring to FIG. 14, D1, the width 1104, is shown along side the value thereof, which is 40. Similarly, dimensions D2, illustratively height 1102 of cylinder block, D3, illustratively length 1106 of cylinder block, and D4, illustratively diameter 1404 of circle of cylinder block, are represented in cells D3, E3, and G3 of design table 1501.

Design table 1501 provides the user with the ability to add alternative sets of dimensions to the model. Essentially, alternative sizes are added by adding additional rows to design table 1501, where the values of the dimensions vary from row to row.

Shown in FIG. 16 is the design table 1501 including three alternative cylinder body sizes, where each alternative tube size is contained in a separate row. Illustratively, row 3 contains data for dimensions and states of the first instance 1410 of cylinder block, i.e. a cylinder block with a 25 mm bore tube. Design table 1501 of FIG. 16 contains the data for dimensions and states of the second instance 1412 of cylinder block, i.e. a cylinder block with a 32 mm bore tube in row 4 and the data for dimensions and states of the third instance 1414 of cylinder block, i.e. a cylinder block with a 40 mm bore tube in row 5. The number of different alternative sizes that can be defined is only limited by Excel and the computer being used to manipulate the spreadsheet.

Figure 17:
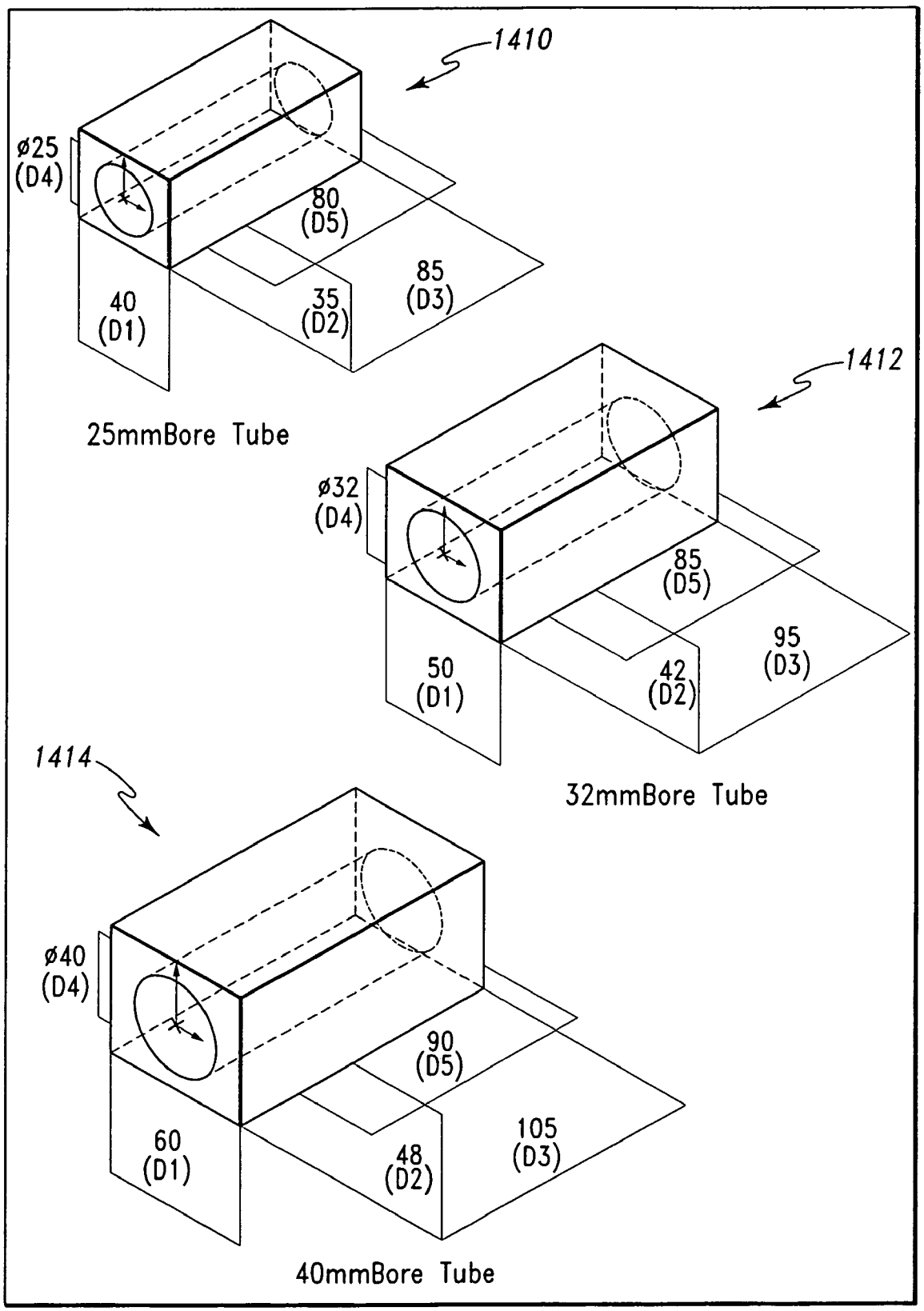
FIG. 17 includes perspective views of CAD models of the three cylinder components for which data is included in FIG. 16.

Shown in FIG. 17 are the visual representations of the three alternatively sized cylinder block models, 1410, 1412, 1414 represented by design table 1501 shown in FIG. 16.

Figure 18:
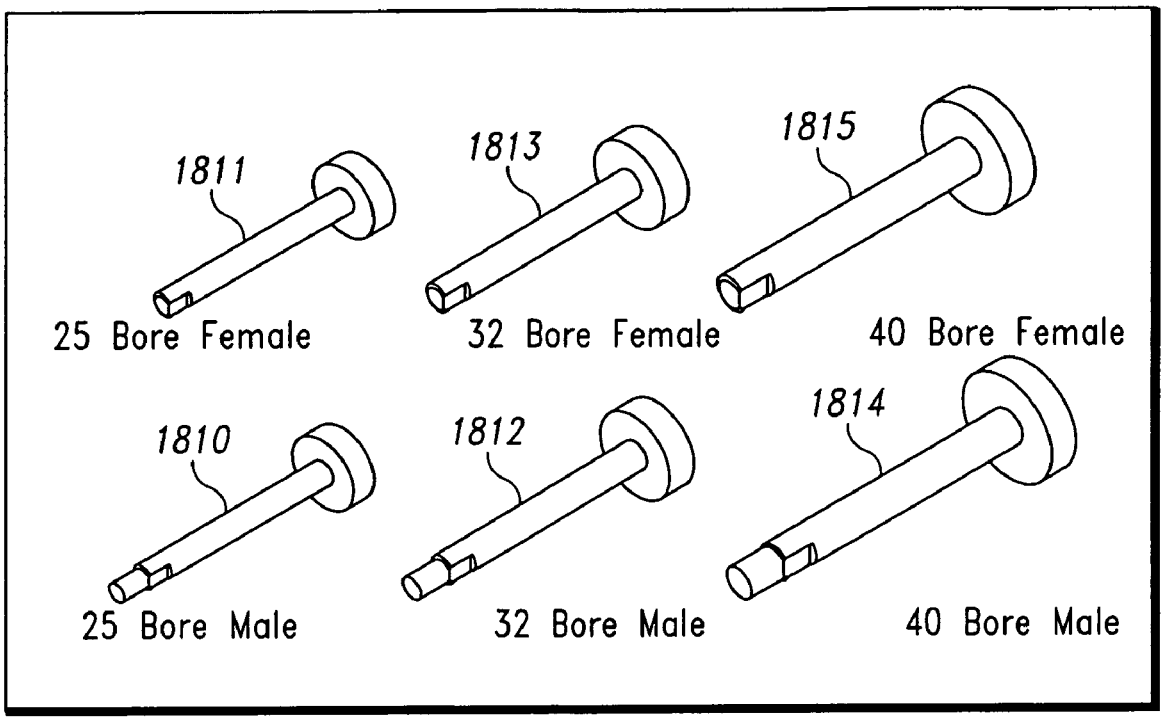
FIG. 18 is a perspective view of CAD models of male and female variations of three instances of rods for valid part numbers of the part of FIG. 10.

Turning to FIG. 18, three alternative sizes of a piston rod are shown. The first size 1810, 1811 of piston rod is illustratively 25 mm. The second size 1812, 1813 of piston rod is illustratively 32 mm. The third size 1814, 1815 of piston rod is illustratively 40 mm. The piston rod may comprise either a male threaded rod end 1810, 1812, 1814, or a female threaded rod end 1811, 1813, 1815. The alternative configurations of the piston rod are shown in FIG. 18. Therefore, a total of six configurations are possible for the piston rod.

Figure 19:
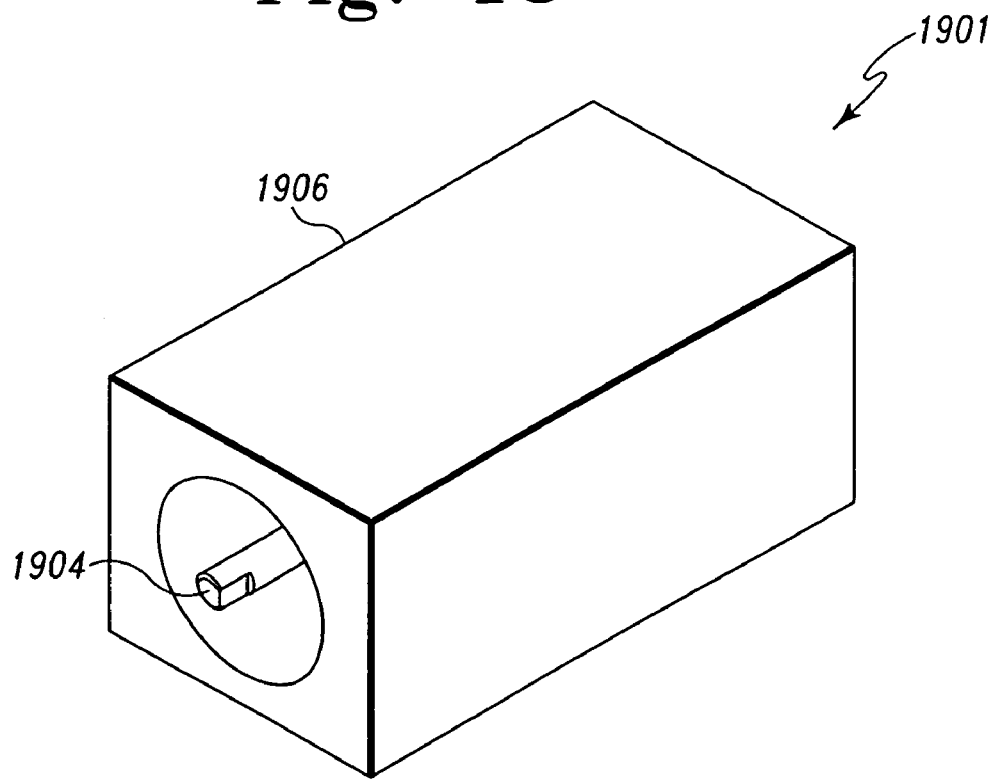
FIG. 19 is a perspective view of a CAD model of an assembly of the part of FIG. 10.

The alternative sizes of the piston rod are operable with the alternative sizes of the cylinder body shown in FIG. 17. Piston rods can only be assembled with cylinder blocks having the same size cylinder bore as the size of the piston rod. Therefore, various assemblies may be created by combining one alternative cylinder body with one alternative piston rod. One such assembly 1901 is shown in FIG. 19. Assembly 1901 comprises piston rod 1904 and cylinder block 1906. Only the portions of assembly 1901 that would be visible if one were viewing a physical part are visible in FIG. 19.

The next step is to create assembly design table. An assembly design table defines the configurations so that the alternative sizes of the cylinder body are automatically associated with the correct alternative sizes of the piston rod. Design table 2001 is shown in FIG. 20. Design table 2001 defines assembly 1901 by defining the various combinations of parts comprising the variations of assembly 1901. Design table 2001 provides a structured method for defining variations of the base (default) model. In the illustrated assembly design table 2001, the valid assemblies 1901 include: a 25 mm bore female assembly comprising first instance 1410 of cylinder block 1906 and female threaded rod version 1811 of piston rod 1904 (the data for the generation of which is shown in row 3 of assembly design table 2001); a 25 mm bore male assembly comprising first instance 1410 of cylinder block 1906 and male threaded rod version 1810 of piston rod 1904 (the data for the generation of which is shown in row 4 of assembly design table 2001); a 32 mm bore female assembly comprising second instance 1412 of cylinder block 1906 and female threaded rod version 1813 of piston rod 1904 (the data for the generation of which is shown in row 5 of assembly design table 2001); a 32 mm bore male assembly comprising second instance 1412 of cylinder block 1906 and male threaded rod version 1812 of piston rod 1904 (the data for the generation of which is shown in row 6 of assembly design table 2001); a 40 mm bore female assembly comprising third instance 1414 of cylinder block 1906 and female threaded rod version 1815 of piston rod 1904 (the data for the generation of which is shown in row 7 of assembly design table 2001); and, a 40 mm bore male assembly comprising third instance 1416 of cylinder block 1906 and male threaded rod version 1816 of piston rod 1904 (the data for the generation of which is shown in row 8 of assembly design table 2001).

The illustrative examples above are overly simplified in order to facilitate understanding of the process. In the real world, components and subassembly models typically contain numerous configurations. Configurations are identified by an alphanumerical name assigned to the configuration, as explained above in the sections discussing the assignment of part numbers 101.

Component design tables define multiple variations of any given part or component. Any variation needed must be defined in the component's design table. For example, if a particular cylinder component for a pneumatic cylinder needs to display ten different diameters for each of ten different bore sizes available for that product, then the component design table needs to define and list at least these ten configurations. In addition to these ten configurations there are two additional configurations included in every component model of the illustrated example files included. These two additional configurations are the default configuration and a configuration named "*". The Default configuration is generally the smallest, simplest most basic model variation.

As noted above, one method by which a component design table defines a component's variations is by the use of suppression/unsuppression states (controlling the visibility) of various features on the component model. Depending upon the particular configuration being defined, some features will be unsuppressed and visible, but some may need to be suppressed and invisible. The "*" configuration is defined for use in the process described herein as a configuration in which all features are suppressed.

Assembly design tables and component design tables share many common characteristics. Each is represented by an Excel spreadsheet. Each is embedded into its respective model. Each utilizes specific syntax to allow the SolidWorks program to read the data contained therein. Cell A1 in both assembly and component design tables contains the name of the design table. Row 2 in both assembly and component design tables is reserved for column headings. Beginning with Row 3, Column A is reserved for configuration names, and the rest of the body of the spreadsheet contains the necessary data that describes and defines each of the configurations. There is one row per configuration, so all the necessary information that SolidWorks needs to generate any given configuration will be contained in a single row. The first cell in every row will contain the name of that configuration.

However, there are important differences between component design tables and assembly design tables. Component design tables describe the visibility, presence and dimensional values of all the features that make up the component. Assembly design tables, on the other hand, describe the visibility, presence and configuration or variation of the entire collection of components as they are represented in the top-level assembly. Often, a component design table will represent and define as many as 50 to 100 categories of dimensions, whereas an assembly design table might not define any dimensions at all. The syntax used to describe the visibility or presence of features in a component design table is different from the syntax used to describe the visibility or presence of individual components in the assembly. A component design table represents or creates variations in the component by controlling changes in individual dimensions that define individual features or aspects of a component. An assembly design table represents or creates variations in the assembly model by controlling which component configurations or variations are to be displayed for any given top level configuration.

Another difference between component design tables and assembly design tables is that every variation or needed configuration of any component must be fully defined, listed and present in the component design table, although some elements of each configuration may actually be controlled from the assembly design table. For example, very simple component models may have as few as 2 or 3 configurations defined and listed, while complex component models may have more than 200 configurations defined and listed.

In a traditional design table, as shown in FIG. 20, different sizes are conveyed through the use of configurations, and each size is displayed using a single row in the assembly design table. Each row lists the appropriate configurations. While this simple illustrative example has only six configurations, it is entirely possible to create designs that can generate millions of configurations. Our research shows that model regeneration times become excessive for models having an excess of 500 configurations. Therefore, research for an alternative method to design table utilization was performed.

SolidWorks documentation presents design tables as static, manually entered collections of data. These static design tables are referred to as traditional design tables herein. However, it is possible to expand the basic idea of a design table by integrating therein the capabilities provided by Excel, such as formulas, lookup tables, and spreadsheets with multiple tabs. This allows for the transformation of the static traditional design table into a dynamic design table. These dynamic design tables are referred to as modified design tables herein.

In modified design table 2101, shown in FIG. 21, all unique characteristics of an assembly design table are described utilizing only a single default row. Simply explained, columns B and C are inserted into the design table. Values are loaded into cells B3 and C3 that contain enough information to uniquely identify all possible configurations of the assembly. The contents of cells A3, E3, and G3, which had been static values up to this point, are replaced with formulas that reference cells B3 and C3.

The contents of the formulas found in cells A3, E3, and G3 modified design table 2101 are as follows. The formula for Cell A3 is [B3 & "Bore" & IF (C3="M", "Male", "Female")]. The formula for cell E3 is [B3 & "mmBoreTube"]. The formula for cell G3 is [B3 & "Bore" & IF(C3="M", "Male", "Female")].

Columns B and C act as programming variables that store information uniquely identifying a possible configuration of the assembly. In this illustrative example, cell B3 may contain the values 25 (as shown, for example, in FIG. 21), 32 (not shown), or 40 (not shown) (indicating bore size), and cell C3 may either be left blank (indicating a female rod end selection) (not shown) or can contain an M value (as shown, for example, in FIG. 21), indicating male rod end. The indication of these two values allows for the recreation of any of the six original rows of the original traditional design table. This same process can be applied in a manner such that a single row of a modified design table can represent all the variations present in a traditional design table having millions of rows.

The description of the system for transferring data via XML above discloses using data names and data values to describe a part number. Data names identical to those used in the XML structure are preloaded into cells B2 and C2, and are identified as being "property" entries by the use of the $PRP@ prefix. In this manner, when an XML data structure is received by the 3D PartStream server, the data value preceded by the data name tag <Bore Size> is loaded into driving cell B3, and the data value preceded by the data name tag <Body Option> is loaded into driving cell C3. For example, the XML name/value pair of <Bore Size><25> is matched to column B, as is shown in modified design table 2101, and the value 25 will be loaded into cell B3. Cells B3 and C3 are, in this illustrative example, the "driving" cells, and the cells containing formulas (D3 through G3) are the "driven" cells.

The structure of an modified assembly design table is unique in that nearly all of the values are being generated by cell formulas in the driven cells that reference or monitor the status of the data loaded into the driving cells. The driving cells contain the variable component elements of a valid part number. These variable component elements are concatenated together with constant component elements into a valid part number by use of the CONCATENATE function available in Excel.

For example, CQ2B12-10 is a valid part number. The "C" and the "Q2" elements of the part number are present in every part number of this series, and are therefore constant component elements. The variable component elements are, "B", "12", and "10".

A modified assembly design table for each product series is stored on the SolidWorks 3D PartStream server. Each modified assembly design table receives all XML requests containing part numbers included in a particular series. The variable component elements of those part numbers change whenever the requested part number changes.

A modified assembly design table is structured to respond to any valid part number that is being requested. Software present on the 3D PartStream loads the relevant values from an XML request into the driving cells of the appropriate modified assembly design table. The entire modified assembly design table is structured around the need to monitor and respond to any valid combination of values that may be loaded into driving cells.

For example, the modified assembly design table associated with the model named CQ22031 has 81 columns and utilizes 64 formulas, many of which are compound formulas. The CQ2 product series has approximately 500,000 valid standard part numbers. Using a traditional design table to describe this series would require 500,000 rows. However, using the modified design table disclosed herein, any of the needed 500,000 configurations can be described using only a single active row and the two "definition" rows, for a total of three rows.

The structure of the "driven" cells is a hierarchy. The hierarchy is based on relation to the driving cells. There always exists first tier cells containing formulas that exclusively monitor the values that appear in the driving cells. These formulas are called primary formulas. A primary formula may monitor one driving cell, or a plurality of driving cells.

There may be a second tier of cells containing formulas that monitor both the values that appear in one or more driving cells and also the values that are generated by one or more of the primary formulas. These formulas are called secondary formulas.

There may be a third tier of cells containing formulas that only monitor the values generated by the secondary formulas. These formulas are called tertiary formulas. Primary, Secondary, and tertiary formulas together provide a comprehensive, structured, controlled series of responses for any combination of values that may be loaded into the driving cells.

Ultimately, the user interacting with the web server is driving the entire operation with his request. The user's request is coded into an XML string and passed to the 3D PartStream server. The 3D PartStream server software extracts the relevant values from the XML string and loads those values into the appropriate cells of the appropriate modified assembly design table. These values "drive" the processing of the modified assembly design table.

A cascading effect occurs when a new set of values are loaded to the driving cells of a modified assembly design table. The primary formulas respond first and generate the values for the cells values in which they are contained. Next, the secondary formulas, which are dependent in part upon some of the results of the primary formulas, respond by generating the values for the cells values in which they are contained. Finally, the tertiary formulas respond by reacting to the values generated by the secondary formulas, and generating the values for the cells values in which they are contained. After the cascade of value generation is complete, software resident on the 3D PartStream server integrates the modified assembly design table back into the model by closing the modified assembly design table, and initiates a model "rebuild" command. Rebuilding the model is a standard function of the SolidWorks software, wherein the software refreshes all the various aspect of the model with all of the newly generated data in the modified assembly design table.

In the case of the CQ2 series there are 64 formulas. Thirty of these formulas are primary formulas, twenty-two are secondary formulas, and the remaining ten are tertiary formulas. Because this collection of 64 formulas is capable of describing over 500,000 distinct CQ2 part numbers, the model itself will respond by regenerating itself in any one of 500,000 different ways.

There are many different kinds of formulas available within Excel. The collection of the formulas we use in the illustrative embodiment described herein are: CONCATENATE, FALSE, FIND, HLOOKUP, IF, INDEX, ISERROR, LEFT, LEN, LOOKUP, MATCH, MID, NOT, OR, RIGHT, SUBSTITUTE, SUM, TRUE, and VLOOKUP. However, one skilled in the art will recognize that other functions or formulas could also be used without departing from the scope of this invention.

The illustrative embodiments described herein are exemplary, and are not intended to limit the claimed invention in any way. Although certain applications are described as specifically well suited for use with the current invention, it is believed to be useful in other applications as well. In fact, there are few, if any, CAD/CAM applications in which the present invention would not offer some benefit. Furthermore, the current invention will not require additional hardware for implementation in most applications.

Although the foregoing embodiments have been described, one skilled in the art can easily ascertain the essential characteristics of the device, and various changes and modifications may be made to adapt the various uses and characteristics without departing from the spirit and scope of this application, as described by the claims which follow.

The invention claimed is:

1. A method of producing a CAD model of a part from a plurality of parts including a plurality of parts having similar components comprising the steps of:
   identifying series of parts from the plurality of parts that have similar components;
   providing a key for each identified series of parts and associating the key with each part in the series of parts;
   identifying the set of parameters necessary for generating a CAD model for each part of the plurality of parts;
   identifying a subset of distinguishing parameters from the set of parameters for each part in a series of parts that distinguishes the part from other parts in the series of parts;
   identifying a base part in each series of parts;
   utilizing a computer loaded with CAD model generating software of the type that generates a CAD model based on a table of parameter values and rebuilds the model when the value of parameters in the table of parameter values is changed, the CAD model generating software relying on a spreadsheet to develop the table of parameter values;

configuring the spreadsheet to include (i) driving cells for receiving the subset of distinguishing parameters and (ii) driven cells;

establishing formulas in each of the driven cells, the formulas using data located in at least one of the driving cells as an input to generate parameters used by the CAD model generating software to build a CAD model, driven cells generating all of the necessary parameters for building the CAD model;

generating a CAD model of the base part for each series of parts by providing the distinguishing parameters of only the base part for each series as a default input to the table of parameter values and associating each generated model with the key; and generating a CAD model of a part in a series of parts other than the base part of the series of parts by supplying the key and the distinguishing parameters of the part to the CAD model generating software.

2. The method of claim 1 and further comprising the step of reducing the members in the subset of distinguishing parameters.

3. The method of claim 1 and further comprising the step of substantially minimizing members in the subset of distinguishing parameters.

4. The method of claim 1 and further comprising the steps of identifying each part of the plurality of parts with a part number and providing means for outputting the associated key and the subset of distinguishing parameters using the part number as input, such means being capable of supplying the key and subset of distinguishing parameters output as input to the CAD model generating software.

5. The method of claim 4 and further comprising the steps of providing a user interface whereby a user provides a part number as input to outputting means.

6. The method of claim 5 wherein the user interface is installed on a client computer on a network, the computer loaded with CAD model generating software is a server computer on the network and wherein the key and subset of distinguishing parameters are communicated via the network from the client computer to the server computer.

7. The method of claim 6 wherein the generated CAD model is communicated via the network from the server computer to the client computer.

8. The method of claim 7 wherein the network is a wide area network.

9. The method of claim 7 wherein the network is the world wide web.

10. The method of claim 7 wherein the user interface accesses a database of valid part numbers and the user provides the part number by accessing the database.

11. The method of claim 10 wherein the database is resident on a server computer on the network.

12. The method of claim 11 wherein the network is the world wide web.

13. The method of claim 1 and further comprising the step of substantially minimizing members in the subset of distinguishing parameters.

14. The method of claim 1 and further comprising the steps of identifying each part of the plurality of parts with a part number and providing means for outputting the associated key and the subset of distinguishing parameters using the part number as input, such means being capable of supplying the key and subset of distinguishing parameters output as input to the CAD model generating software.

15. The method of claim 14 and further comprising the steps of providing a user interface whereby a user provides a part number as input to outputting means.

16. The method of claim 15 wherein the user interface is installed on a client computer on a network, the computer loaded with CAD model generating software is a server computer on the network and wherein the key and subset of distinguishing parameters are communicated via the network from the client computer to the server computer.

17. The method of claim 16 wherein the generated CAD model is communicated via the network from the server computer to the client computer.

18. The method of claim 17 wherein the network is the world wide web.

19. The method of claim 17 wherein the user interface accesses a database of valid part numbers and the user provides the part number by accessing the database.

20. The method of claim 19 wherein the database is resident on a server computer on the network.

21. The method of claim 20 and further comprising the step of substantially minimizing members in the subset of distinguishing parameters.

22. A CAD model, on a computer readable medium, of a part from a plurality of parts produced by the process of:

identifying series of parts from the plurality of parts that have similar components;

providing a key for each identified series of parts and associating the key with each part in the series of parts;

identifying the set of parameters necessary for generating a CAD model for each part of the plurality of parts;

identifying a subset of distinguishing parameters from the set of parameters for each part in a series of parts that distinguishes the part from other parts in the series of parts;

identifying a base part in each series of parts;

utilizing a computer loaded with CAD model, generating software of the type that generates a CAD model based on a table of parameter values and rebuilds the model when the value of parameters in the table of parameter values is changed, the CAD model generating software relying on a spreadsheet to develop the table of parameter values;

configuring the spreadsheet to include (i) driving cells for receiving the subset of distinguishing parameters and (ii) driven cells;

establishing formulas in each of the driven cells, the formulas using data located in at least one of the driving cells as an input to generate parameters used by the CAD model generating software to build a CAD model, driven cells generating all of the necessary parameters for building the CAD model;

generating a CAD model of the base part for each series of parts by providing the distinguishing parameters of only the base part for each series as a default input to the table of parameter values and associating each generated model with the key; and generating a CAD model of a part in a series of parts other than the base part of the series of parts by supplying the key and the distinguishing parameters of the part to the CAD model generating software.

23. The CAD model on a computer readable medium of claim 22 wherein the production process further comprises the step of reducing the members in the subset of distinguishing parameters.

24. The CAD model on a computer readable medium of claim 22 wherein the production process further comprises the step of substantially minimizing members in the subset of distinguishing parameters.

25. The CAD model on a computer readable medium of claim 22 wherein the production process further comprises the step of identifying each part of the plurality of parts with a part number and providing means for outputting the associated key and the subset of distinguishing parameters using the part number as input, such means being capable of supplying the key and subset of distinguishing parameters output as input to the CAD model generating software.

26. The CAD model on a computer readable medium of claim 25 wherein the production process further comprises the step of providing a user interface whereby a user provides a part number as input to outputting means.

27. The CAD model on a computer readable medium of claim 26 wherein the user interface is installed on a client computer on a network, the computer loaded with CAD model generating software is a server computer on the network and wherein the key and subset of distinguishing parameters are communicated via the network from the client computer to the server computer.

28. The CAD model on a computer readable medium of claim 27 wherein the generated CAD model is communicated via the network from the server computer to the client computer.

29. The CAD model on a computer readable medium of claim 28 wherein the network is a wide area network.

30. The CAD model on a computer readable medium of claim 28 wherein the network is the world wide web.

31. The CAD model on a computer readable medium of claim 28 wherein the user interface accesses a database of valid part numbers and the user provides the part number by accessing the database.

32. The CAD model on a computer readable medium of claim 31 wherein the database is resident on a server computer on the network.

33. The CAD model on a computer readable medium of claim 32 wherein the network is the world wide web.

34. The CAD model on a computer readable medium of claim 22 wherein the production process further comprises the step of substantially minimizing members in the subset of distinguishing parameters.

35. The CAD model on a computer readable medium of claim 22 wherein the production process further comprises the step of identifying each part of the plurality of parts with a part number and providing means for outputting the associated key and the subset of distinguishing parameters using the part number as input, such means being capable of supplying the key and subset of distinguishing parameters output as input to the CAD model generating software.

36. The CAD model on a computer readable medium of claim 35 wherein the production process further comprises the step of providing a user interface whereby a user provides a part number as input to outputting means.

37. The CAD model on a computer readable medium of claim 36 wherein the user interface is installed on a client computer on a network, the computer loaded with CAD model generating software is a server computer on the network and wherein the key and subset of distinguishing parameters are communicated via the network from the client computer to the server computer.

38. The CAD model on a computer readable medium of claim 37 wherein the generated CAD model is communicated via the network from the server computer to the client computer.

39. The CAD model on a computer readable medium of claim 38 wherein the network is the world wide web.

40. The CAD model on a computer readable medium of claim 38 wherein the user interface accesses a database of valid part numbers and the user provides the part number by accessing the database.

41. The CAD model on a computer readable medium of claim 38 wherein the database is resident on a server computer on the network.

42. The CAD model on a computer readable medium of claim 41 wherein the production process further comprises the step of substantially minimizing members in the subset of distinguishing parameters.

43. A method of generating CAD models of a part selected from a series of parts which are all variants of a base part and are distinguishable from each other based on parameters including the sizes of similar components and the presence of component add-ons, the method comprising the steps of:
identifying controlling parameters, the values of which dictate the sizes of various components, and available component add-ons of a part selected from the series of parts;
generating an assembly design table including driving cells and driven cells, the driving cells being configured to receive the controlling parameters and the driving cells including formulas that reference at least one of the driving cells as input to generate the remaining parameters required for the generation of a CAD model based upon the values of the controlling parameters;
developing a base assembly model of the base part of the series of parts;
selecting a part to be modeled that is a variant of the base part;
generating the values of the controlling parameters for the selected variant of the base part;
generating a CAD model of the selected variant of the base part using generated values of the controlling parameters to modify the base assembly model.

44. The method of claim 43 and further comprising the steps of utilizing a client computer on a network to generate the values of the controlling parameters of the selected variant of the base part and utilizing a server computer on the network to generate the CAD model.

45. The method of claim 44 wherein the values of the controlling parameters are communicated via the network to CAD modeling software on the server computer which is programmed with the established formulas to generate the remaining parameters required for the generation of a CAD model.

46. The method of claim 44 wherein the generated CAD model is downloaded over the network to the client computer.

47. The method of claim 46 wherein the network is the internet.

48. The method of claim 43 wherein the network is the internet.

49. The method of claim 48 wherein the only value of parameters transmitted over the network from the client to the server is the value of the controlling parameters.

50. A method for generating a CAD model of a part selected from a series of variants of a base part, the method comprising:
utilizing a computer loaded with CAD model generating software that relies upon assembly tables to model a part, the CAD model generating software relying on a spreadsheet to develop the table of parameter values;

identifying program variables based on the parameters of each part of the series of variants of a base part sufficient to distinguish each part from the other parts in the series of variants of the base part;

configuring the spreadsheet to include (i) driving cells for receiving the subset of distinguishing parameters and (ii) driven cells;

establishing formulas in each of the driven cells, the formulas using data located in at least one of the driving cells as an input to generate parameters usable by the CAD model generating software to build a CAD model, the driven cells generating all of the necessary parameters for building the CAD model, wherein at least one of the driven cells includes a formula that uses data located in at least one of the driving cells and at least one of the other driven cells to generate parameters used by the CAD model generating software to build a CAD model;

using the program variables and formulas to generate a base model assembly table for modeling the base part;

selecting a part from the series of variants of a base part for which a CAD model is desired;

using the identified program variables of the selected part and identified formulas to modify the base model assembly table to generate a CAD model of the selected part.

51. The method of claim 50 further comprising the step of creating a unique smart part number for each part of the series of variants of a base part from which the identified program variables for that part can be generated and wherein the selecting a part step includes a selecting a smart part number.

52. The method of claim 51 wherein the CAD model generating software relies upon assembly table models generated by a spreadsheet and further comprising the step of configuring the spreadsheet to include driving cells for receiving the program variables and driven cells that include the identified formulas.

53. The method of claim 52 wherein the identified formulas include primary formulas that rely solely on the program variables as input variables to generate data and secondary formulas that rely on the program variables and data generated by the primary formulas as input variable to generate data.

54. The method of claim 53 wherein the identified formulas include tertiary formulas that rely upon the data generated by the secondary formulas as input variables to generate data.

55. The method of claim 54 further comprising the steps of creating a database of valid smart part numbers and the selecting step includes using a user interface to select a valid smart part number.

56. The method of claim 55 wherein the computer loaded with the CAD generating software is a server on a network, the database loaded on a computer on the network and the user interface is loaded on a computer on the network.

57. A method for obtaining a CAD model of a valid part number for a part in a series of parts including an assembly of similar components comprising the steps of:

utilizing a user interface for selection of a desired valid part number for which a CAD model is desired;

generating driving cell data for the desired valid part number;

utilizing a computer loaded with CAD model generating software that generates CAD models from assembly design tables which contain cells including data and which access component design tables;

generating component design tables for the available components;

generating an assembly design table including a default row having driving cells and driven cells, the driven cells including formulas that use data stored in the driving cells to generate data used by the CAD model generating software to generate CAD models;

inputting the generated driving cell data into the driving cells of the generated assembly design table.

58. The method of claim 57 wherein the user interface is resident on a client computer of a network and the computer loaded with the CAD model generating software is a server computer on the network.

* * * * *

UNITED STATES PATENT AND TRADEMARK OFFICE
CERTIFICATE OF CORRECTION

PATENT NO.        : 7,620,525 B2                                    Page 1 of 1
APPLICATION NO.   : 10/306135
DATED             : November 17, 2009
INVENTOR(S)       : Denny et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Twenty-sixth Day of October, 2010

David J. Kappos
*Director of the United States Patent and Trademark Office*